W. W. ROUTZAHN.
COMBINATION TIRE AND BAGGAGE CARRIER.
APPLICATION FILED JAN. 24, 1917.

1,248,404.

Patented Nov. 27, 1917.
2 SHEETS—SHEET 1.

Witnesses:

Inventor,
W. W. Routzahn.
Attorney

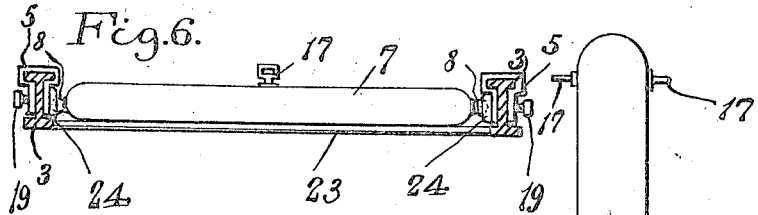
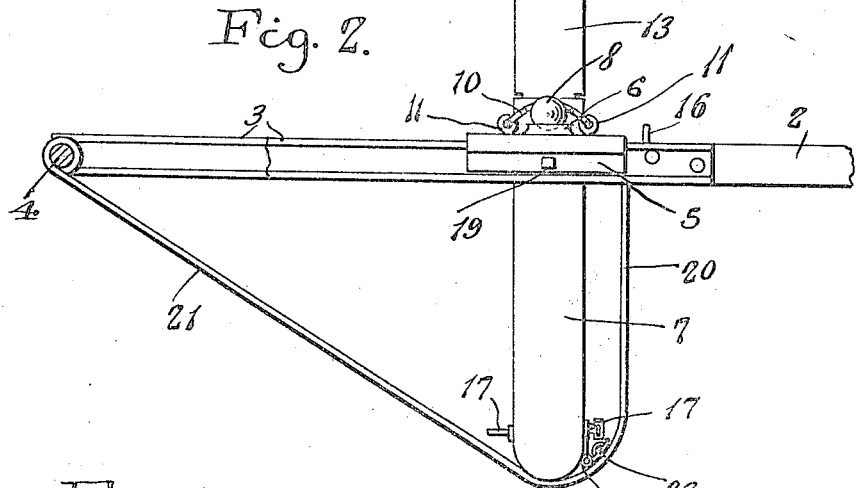
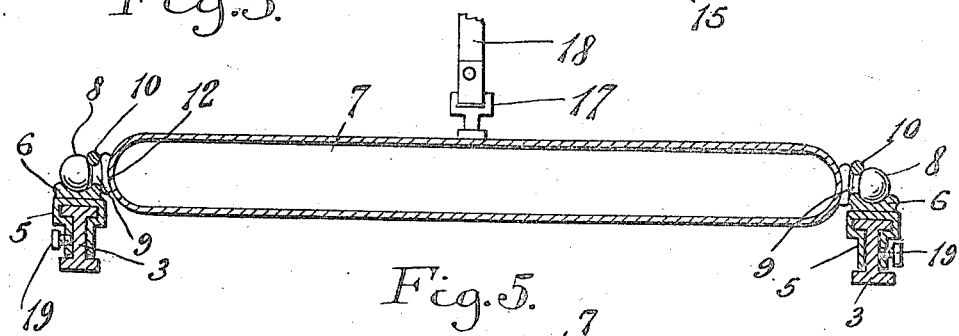
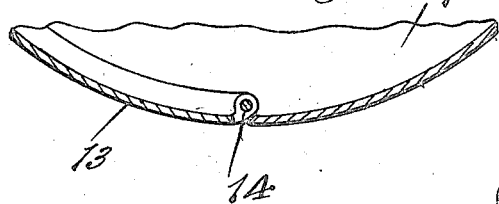

UNITED STATES PATENT OFFICE.

WARREN W. ROUTZAHN, OF ARROYO GRANDE, CALIFORNIA.

COMBINATION TIRE AND BAGGAGE CARRIER.

1,248,404.　　　　Specification of Letters Patent.　　Patented Nov. 27, 1917.

Application filed January 24, 1917. Serial No. 144,157.

*To all whom it may concern:*

Be it known that I, WARREN WILLITS ROUTZAHN, a citizen of the United States, residing at Arroyo Grande, in the county of San Luis Obispo and State of California, have invented certain new and useful Improvements in Combination Tire and Baggage Carriers; and I do hereby declare the following to be a full, clear, and exact description of the invention, such as will enable others skilled in the art to which it appertains to make and use the same.

This invention relates to a combination tire and baggage carrier and has for one of its objects the provision of a device of this character, which may be readily applied to an automobile for carrying a tire and which may be readily used for supporting baggage.

Another object of this invention is to provide a supporting structure secured to the automobile carrying a casing adapted to receive a tire and which may be so positioned as to support baggage when desired.

A further object of this invention is the provision of means for locking the casing in a vertical or horizontal position and when in the latter position, it is capable of supporting baggage and the like thereon.

A still further object of this invention is the provision of a combination tire and baggage carrier of the above stated character, which shall be simple, durable and efficient and which may be manufactured and sold at a comparatively low cost.

With these and other objects in view as will become more apparent as the description proceeds, the invention consists of certain novel features of construction, combination and arrangement of parts as will be hereinafter more fully described and claimed.

Figure 1:
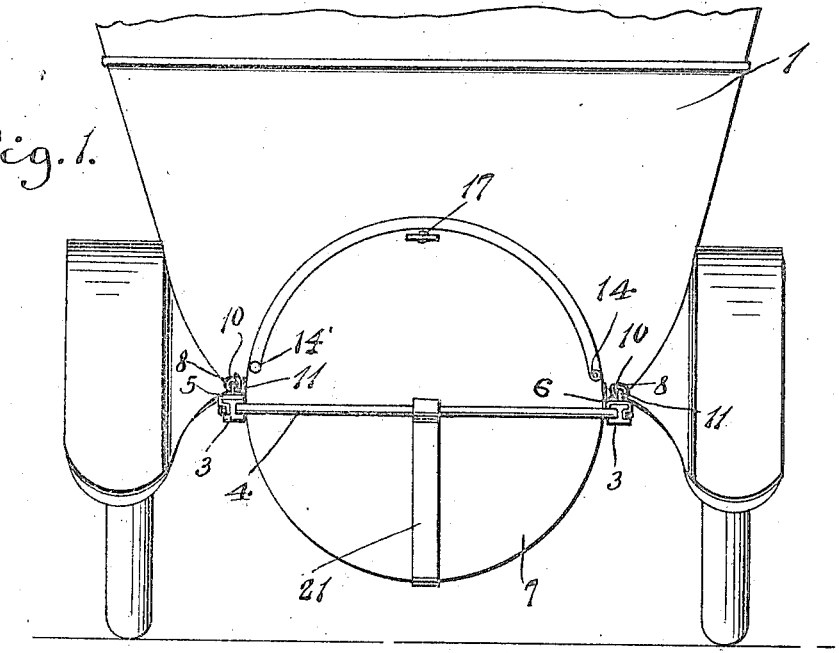
Figure 4:
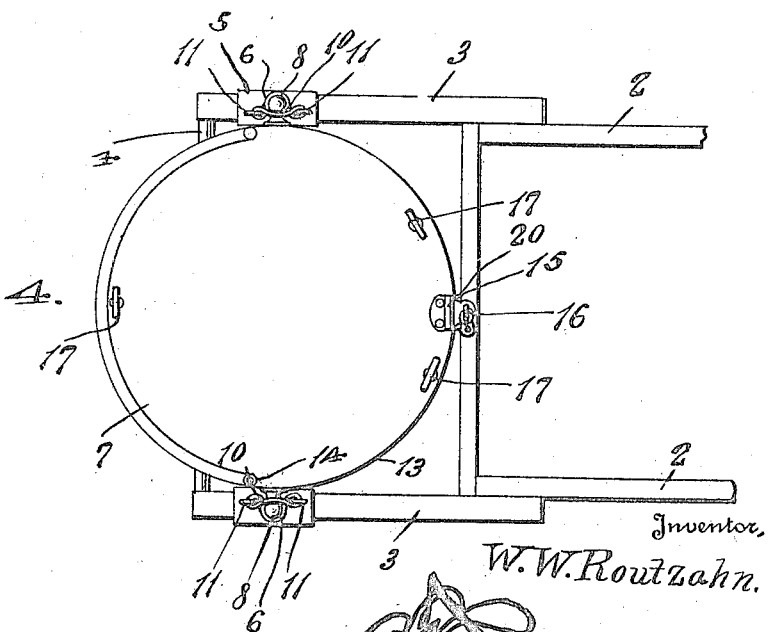

For a complete understanding of my invention, reference will be had to the following description and accompanying drawings, in which:

Figure 1 is a rear elevation of an automobile illustrating the combination tire and baggage carrier applied thereto and constructed in accordance with my invention, Fig. 2 is a side elevation of the same illustrating the casing in a vertical position, Fig. 3 is a horizontal sectional view of the same with the casing in a horizontal position, Fig. 4 is a top plan view of the same illustrating the means of locking the casing in a horizontal position, Fig. 5 is a detail sectional view of the casing illustrating the door thereto, Fig. 6 is a detail sectional view of a modified form of frame for permitting the casing to be supported in parallel alinement with the supporting structure when in a horizontal position.

Referring in detail to the drawings, the numeral 1 indicates as an entirety, an automobile having the usual chassis 2 to which my invention is attached. A pair of supporting bars 3 are bolted or otherwise secured to the chassis 2 at the rear end thereof. The bars 3 are connected by cross bars 4.

Suitable cuffs 5 are slidably mounted upon the bars 3 and have formed upon the upper faces thereof bearings 6.

A circular casing 7 substantially the size of the tire to be employed upon the automobile 1, is provided with a pair of oppositely disposed balls or spheres 8 which are received by the bearings 6 as clearly illustrated in Fig. 3. The neck of the balls or spheres 8 are grooved as illustrated at 9 to receive retaining elements 10 that have their ends secured to eye-bolts or like members 11, which are carried by the cuffs 5 for pivotally securing the casing to the bars 3. The casing 7 has its periphery rounded as illustrated at 12 to conform to the contour of a tire so that when a tire is placed within the casing, and it will snugly fit the walls thereof, preventing the tire from moving in relation to the casing, obviating undue friction upon the tire. The casing 7 is provided with a doorway, which is closed by a door 13 that is hinged to the peripheral wall of the casing as illustrated at 14 and detachably secured as at 14', whereby the tire may be removed and replaced within the casing whenever desired.

A hasp 15 is secured to the top wall of the casing 7 adjacent one edge thereof and is adapted to receive a staple 16 carried by the rear of the chassis 2 whereby a padlock or the like may be placed through the staple 16 for retaining the casing 7 in a substantially horizontal position as illustrated in Fig. 4. When the casing 7 is in a horizontal position the outer portion thereof rests upon the cross bars 4, whereby an efficient base or support is provided on which may be positioned baggage. Secured to the upper face of the casing is a plurality of brackets 17 for receiving straps 18 for retaining the baggage upon the casing. To prevent any movement of the cuffs 5 upon the bars 3 when the casing is in a horizontal position, set screws 19 are carried by the cuffs and turned into engagement with the bars, thus preventing any sliding movement of said cuffs upon the bars.

A brace 20 is secured to the rear of the chassis 2 and depends downwardly therefrom and is bent upwardly in an inclined plane as illustrated at 21 and secured to the cross bars 4 for forming a support to the casing 7 when swung to a vertical position as illustrated in Fig. 2. A suitable spring catch 22 is secured to the brace 20 for engagement with the casing 7 to hold the same in a vertical position. When not desiring to use the casing 7 as a support for baggage, the set screws 19 are released from engagement with the bars 3 and the cuffs are slid forwardly or in the direction of the body of the automobile and the casing is then swung to a vertical position engaging the catch 22, which retains said casing against movement.

Referring to the modified form of cross bars as illustrated in Fig. 6, it consists of a substantially U-shaped member 23 which is secured to the bars 3 and is adapted to support the upper face of the casing 7 in parallel alinement with the upper faces of the bars 3 when the casing 7 is in a horizontal position.

The bearings 24 are placed upon the inner faces of the cuffs 5 instead of upon the upper faces as that of the preferred form so that the casing 7 will be journaled between the bars 3 instead of on top of them as in my preferred form of invention.

While I have shown and described the preferred embodiment of my invention, it will be understood that minor changes of construction, combination and arrangement of parts may be made without departing from the spirit and scope of the invention as claimed.

What is claimed is:

1. A device of the character set forth comprising a supporting structure, bearings adjustably secured to the supporting structure, a casing journaled in said bearings and adapted to receive a tire, means for holding the casing in a horizontal position to support baggage, and means for holding the casing in a vertical position.

2. A device of the character set forth comprising a supporting structure, cuffs slidable on said supporting structure, means for holding the cuffs against sliding movement on the supporting structure, bearings formed on the cuffs, a circular casing journaled in the bearings and adapted to receive a tire, means for holding the casing in a horizontal position to support baggage, and means for holding the casing in a vertical position.

3. A device of the character set forth comprising a supporting structure, bearings slidable on said supporting structure, a circular casing pivoted to said bearings, a door within said casing for receiving a tire, and means for securing baggage to the exterior of the casing.

4. The combination with an automobile including a chassis, a supporting structure secured to the chassis bearings slidable on the supporting structure, a circular casing pivoted to said bearings, a door in said casing for receiving a tire, a hasp secured to the casing, a staple secured to the chassis and adapted to receive the hasp for supporting the casing in a horizontal position, means for securing baggage to the casing when in a horizontal position, and means for securing the casing in a vertical position.

5. The combination with an automobile having a chassis, of a pair of rearwardly extending bars secured to the chassis, a cross bar connecting the pair of bars, bearings carried by the bars, a casing pivoted to the bearings and adapted to receive a tire, means for locking the casing in a horizontal position to support baggage, a brace secured to the chassis and bent downwardly and upwardly and secured to the cross bar, and a spring catch carried by the brace for engaging the casing supported in a vertical position.

In testimony whereof I affix my signature in presence of two witnesses.

WARREN W. ROUTZAHN.

Witnesses:
  Mrs. M. A. MERRILL,
  FLORENCE M. ROUTZAHN.